United States Patent [19]
Huang

[11] Patent Number: 6,078,315
[45] Date of Patent: Jun. 20, 2000

[54] TOUCH PANEL USING ACOUSTIC WAVE REFLECTION

[75] Inventor: Jianming Huang, Round Rock, Tex.

[73] Assignee: MicroTouch System Inc.

[21] Appl. No.: 08/963,009

[22] Filed: Nov. 3, 1997

[51] Int. Cl.[7] .................................................. G09G 5/00
[52] U.S. Cl. ........................................ 345/177; 178/18.04
[58] Field of Search .................................... 345/173, 176, 345/177; 178/18.01, 18.03, 18.04; 367/907

[56] References Cited

U.S. PATENT DOCUMENTS

| | | |
|---|---|---|
| 3,653,031 | 3/1972 | Hlady . |
| 3,673,327 | 6/1972 | Johnson . |
| 4,644,100 | 2/1987 | Brenner et al. . |
| 4,645,870 | 2/1987 | Adler . |
| 4,665,282 | 5/1987 | Sato et al. . |
| 4,700,176 | 10/1987 | Adler . |
| 4,746,914 | 5/1988 | Adler . |
| 4,791,416 | 12/1988 | Adler . |
| 5,072,427 | 12/1991 | Knowles . |
| 5,162,618 | 11/1992 | Knowles . |
| 5,177,327 | 1/1993 | Knowles . |
| 5,243,148 | 9/1993 | Knowles . |
| 5,260,521 | 11/1993 | Knowles ................................. 178/18 |
| 5,329,070 | 7/1994 | Knowles . |
| 5,451,723 | 9/1995 | Huang et al. . |
| 5,573,077 | 11/1996 | Knowles ................................. 178/19 |
| 5,591,945 | 1/1997 | Kent ...................................... 178/19 |
| 5,708,461 | 1/1998 | Kent ..................................... 345/177 |
| 5,739,479 | 4/1998 | Davis-Cannon et al. ............. 345/177 |
| 5,856,820 | 1/1999 | Weigers et al. ....................... 345/177 |

OTHER PUBLICATIONS

Igor. Aleksndrovich Viktorov, Rayleigh and Lamb Waves, Plenum Press, 1967, New York.

D. C. Worlton, Journal of Appl. Phys., vol. 32, No. 6, p967 (1961).

W. P. Mason, Physical Acoustics, vol. 1– Part A p120, Academic Press 1964, New York and London.

*Primary Examiner*—Kent Chang

[57] ABSTRACT

A touch position sensor is shown in which a transducer or transducer array mounted to a side of a substrate generates pulse shear-mode acoustic wave and receives the partial wave reflected by the finger or other styles. An electronic circuitry connected to the transducers determine the position of the finger or style in geometrical coordinate terms by detecting time interval between the transmitted wave and reflected wave.

8 Claims, 13 Drawing Sheets

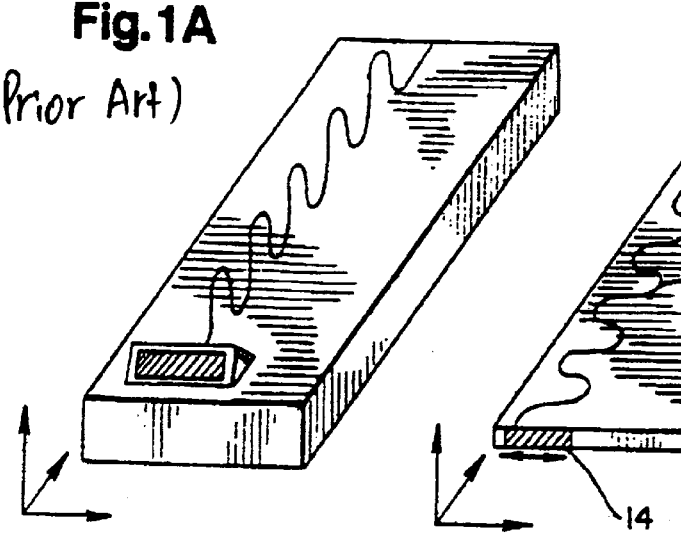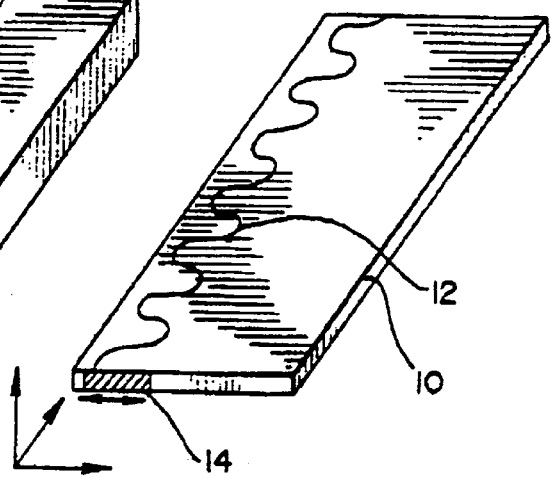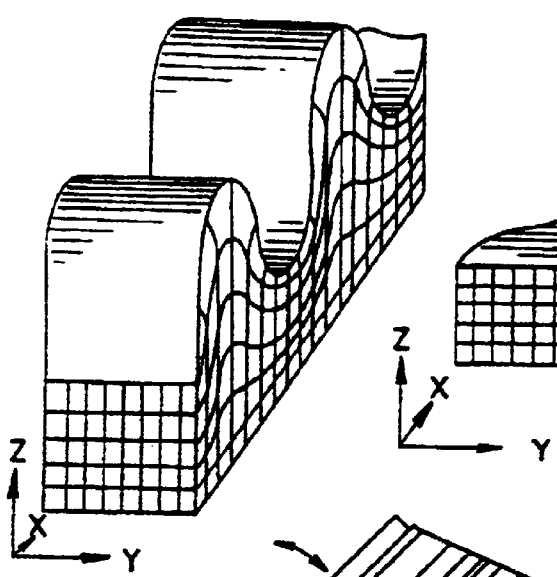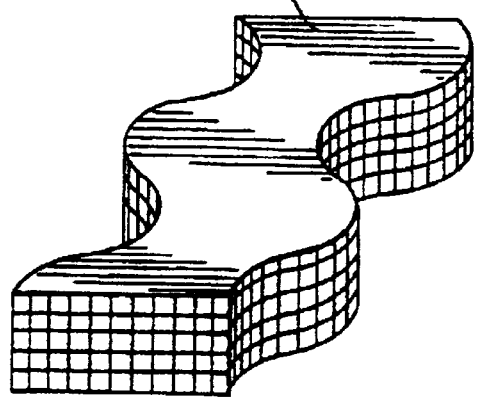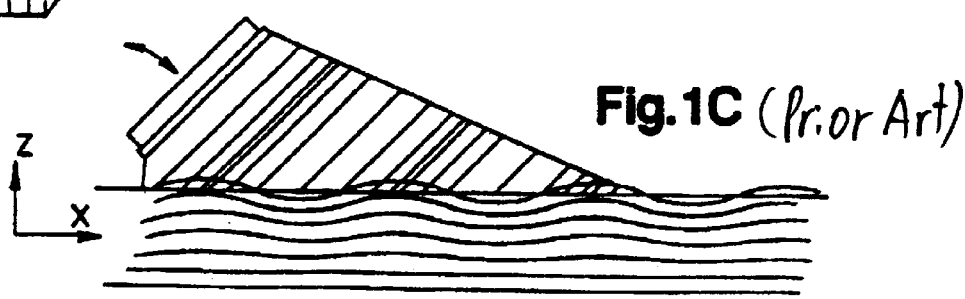

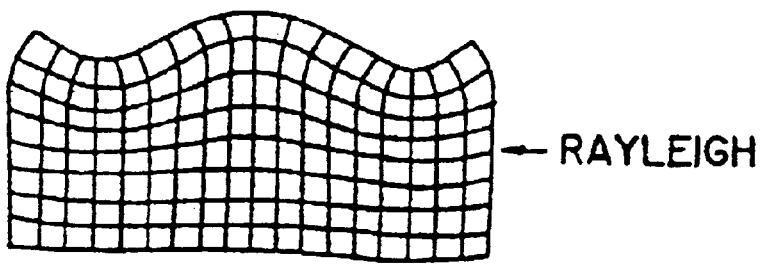
Fig. 1D
(Prior Art)
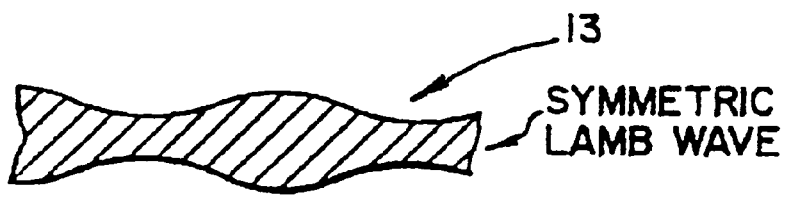
Fig. 1E
(Prior Art)
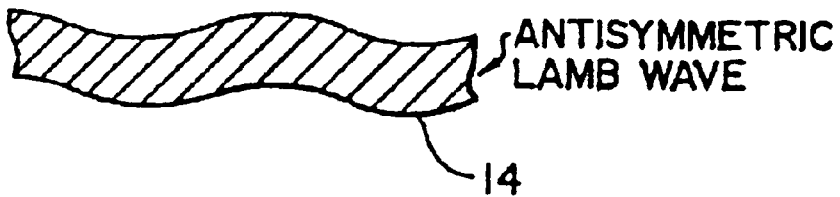
Fig. 1F
(Prior Art)

TOUCH PANEL USING ACOUSTIC WAVE REFLECTION

TECHNICAL FIELD

The present invention relates to an acoustic touch position sensor and more particularly to such a sensor wherein an acoustic wave other than surface wave is imparted into a substrate by a transducer mounted at the edge of substrate. The transducer is also used to receive the partial wave reflected by the finger or other stylus. An electronic circuitry connected to the transducers determine the position of the finger or stylus in geometrical coordinate terms by detecting time interval between the transmitted wave and reflected wave.

BACKGROUND OF THE INVENTION

Touch position sensors usable with finger or other stylus have been taught in U.S. patents including (i) a surface elastic wave type in prior art U.S. Pat. Nos. 3,134,099, 3,653,031, 3,673,327, 4,642,423, 4,644,100, 4,645,870, 4,700,176, 4,746,914, 4,791,416 and (ii) a plate wave type in prior art U.S. Pat. Nos. 4,665,282, 5,072,427, 5,162,618, 5,177,327, 5,243,148, 5,260,521, 5,329,070, 5,451,723, 5,573,077, 5,591,945.

Acoustic touch position sensors utilizing surface elastic wave as taught by the above-mentioned type (i) patents have a number of problems which are more readily understood when the nature of the surface acoustic wave used in these sensors is considered. If as in the above-mentioned patents, the touch plate consists of a uniform, non-piezo electric medium, and the acoustic wave is confined at or near a single surface such as an outer surface of the touch plate, the surface acoustic wave is known as a Rayleigh wave. These waves have X and Z components such that disturbed particles move elliptically in the X-Z plane. It is characteristic of these waves that the disturbance decays rapidly with depth, that is in the -Z direction, so that the wave energy is essentially confined at or near the surface of the touch plate. Strictly, Rayleigh waves exist only in an infinitely thick medium. Waves in a uniform, non-piezoelectric medium of finite thickness that are confined to a single surface as shown in FIGS. 1A–1D are more precisely termed quasi-Rayleigh waves. Given a long enough propagating path in a medium of finite thickness, quasi-Rayleigh wave energy will not be confined at or near a single surface, but will transfer back and forth between the outer surfaces of the plate. A touch sensor according to the above mentioned patents, would be inoperable under these conditions because a touch in a region of one outer surface where complete transference of the wave to the opposite outer surface has taken place, will not disturb the wave, and is therefore undetectable. In practice, in order to provide a wave that is confined to a single surface, the thickness of the touch plate must be at least three to four times the wavelength of the wave imparted into the substrate, wherein the length and breadth of the touch plate are also limited.

If the thickness of the touch plate is for example two Rayleigh wavelengths or less, the waves emanating from the source transducers utilized in the above patents are clearly distinguishable from Rayleigh/quasi Rayleigh, and other surface acoustic wave (SAW) modes and are known as Lamb waves as shown in FIGS. 1E and 1F. Lamb waves exist in two groups of various orders, all of which propagate independently of one another. One group is characterized by particle displacement that is symmetric with respect to the median plane of the plate. The other group of Lamb waves is characterized by particle displacement that is anti-symmetric with respect to the median plane. In general a specific order within the symmetric Lamb wave group differs in phase and group velocity from the identical order of the anti-symmetric Lamb wave group. In particular with a sufficient plate thickness equal to or greater than two Rayleigh wavelengths, two modes of approximately equal amplitude are mainly excited, the zeroth order symmetrical Lamb waves and the zeroth order anti-symmetrical Lamb waves. As seen in FIGS. 1E and 1F, the symmetrical and anti-symmetrical Lamb waves are not confined to a single surface of the touch plate, but extend through the plate to the opposite surface thereof. When in phase however, that is initially at and close to the source of the waves, the two Lamb waves combine to produce a quasi Rayleigh wave, as can be seen from a comparison of FIGS. 1E and 1F to FIG. 1D. As the two Lamb wave modes travel further from the source, due to the differing phase velocities and the resultant phase difference between them, there is a complete transference of wave energy from the outer surface on which the transducer, generating the wave, is mounted to the opposite outer surface. This transference of energy between the outer surfaces of the plate occurs at regularly spaced intervals, making a touch plate having large enough dimensions for this transference to occur, unsuitable for a touch position sensor.

From the above, it is seen that touch position sensors as shown in the above mentioned patents utilizing surface acoustic waves and more particularly quasi-Rayleigh waves, as is necessary for these sensors to operate, are limited to relatively thick panels, i.e., panels having a thickness of three to four times the wavelength of the surface acoustic wave propagating therein. Further, quasi-Rayleigh waves are confined at and near a single surface. The consequence of using quasi-Rayleigh waves according to the above patents leads to several undesirable attributes, namely excessive sensitivity to contaminants or other materials abutting the touch panel, and excessive panel weight and thickness for many applications. The excessive sensitivity to contamination is due to the confinement of wave energy at or near the confining surface. As a result the quasi-Rayleigh wave energy or a large fraction thereof is absorbed by even modest amounts of surface contaminants. The effect of near or total absorption of wave energy by contamination, sealant or other materials abutting the plate, is to create acoustic shadows or blind spots extending along the axes that intersect the contaminant. A touch position sensor according to the above mentioned patents cannot detect touch if one or both coordinates is on a blinded axis. In a sense, touch panels utilizing quasi-Rayleigh waves are unduly sensitive to contamination or abutting materials. The scope for optimizing the performance of a touch sensor according to the above patents is limited because touch sensitivity and minimum touch panel thickness are not independent choices. In order to support a quasi-Rayleigh wave in a touch panel of reduced thickness, its other dimensions remaining the same, the wavelength must be reduced to preserve single surface confinement. It is characteristic of Rayleigh/quasi Rayleigh waves that their confinement depth is related to wavelength, with confinement depth decreasing as the wavelength is reduced. As a result, the wave is confined to a shallower region bounded by the surface, and the proportion of wave energy absorbed by a given absorbing medium is increased. Experimentally this is found to vary, approximately by the inverse square of the wavelength. As discussed previously, touch sensors according to above patents can be considered unduly sensitive for some applications, even for relatively thick panels, hence the effect of reducing touch panel thickness results in touch sensors even more sensitive to surface contamination and other abutments. Conversely, reducing sensitivity by increasing the quasi-Rayleigh wavelength results in increased panel thickness and weight. Substantial losses in wave energy over distance as a result of air damping of the surface acoustic wave is also significant since surface acoustic waves are confined to the surface of the touch plate. The energy losses due to air damping further limit the size of the touch plate. As shown in FIGS. 1A and 1C, surface acoustic waves are imparted into a touch plate utilizing a transducer mounted on a wedge that is in turn mounted on the touch surface of the plate wherein the transducer vibrates in the direction shown to produce a compression bulk wave that propagates in the wedge to impart a surface acoustic wave in the touch plate. This type of wave generating device has several drawbacks. Because the device must convert a compressional bulk wave to a surface acoustic wave, the efficiency of the device is lower and the processing cost is higher in practice than that the transducer produced waves were of the same type as those imparted into the plate, i.e., via direct conversion. Also, because the wedge extends above the plate, it must be accommodated for in mounting the plate. Wedges are typically made of plastic thus creating a difficulty in bonding the wedge to a glass plate. Further, the transducer must be bonded to the wedge and the wedge then bonded to the touch plate. Because problems with reliability increase with the number of bonds required, this surface acoustic wave generating device is not as reliable as other wave generating devices requiring fewer bonds.

The above-mentioned disadvantage in using elastic surface wave in touch panel is the main reason that plate wave type touch panel in prior art U.S. patents were disclosed. These touch panel employing acoustic plate wave as taught in prior art U.S. Pat. Nos. 4,665,282, 5,072,427, 5,162,618, 5,177,327, 5,243,148, 5,260,521, 5,329,070, 5,451,723, 5,573,077, 5,591,945 overcome the problems imposed by the surface acoustic wave, but have their own problems. Ichiya et al's system disclosed in U.S. Pat. No. 4,665,282 requires the use of a special touch stylus capable of sensing longitudinal waves traveling across the panel.

Knowles's system disclosed in U.S. Pat. No. 5,072,427 uses Zohps shear waves as shown in FIGS. 2A–2B. and first order Lamb wave as shown in FIGS. 1E an 1F traveling across the panel. A reflective array is disposed along the first axis to convert portions of the Zohps shear wave to either first symmetric mode or first anti-symmetric mode of Lamb waves along the plurality of parallel paths extending across a touch surface of the substrate to a second reflective array the axis of which is parallel to the axis of first reflective array. Knowles's systems disclosed in U.S. Pat. No. 5,162,618, uses first order Lamb wave traveling across the panel. A reflective array is disposed along the first axis to reflect portions of the first mode Lamb waves to either first symmetric mode or first anti-symmetric mode of Lamb waves along the plurality of parallel paths extending across a touch surface of the substrate to a second reflective array the axis of which is parallel to the axis of first reflective array. Knowles's systems disclosed in U.S. Pat. No. 5,177,327, 5,243,148, 5,260,521, 5,329,070 as well as Huang et al's system disclosed in U.S. Pat. No. 5,451,723 employ Zohps shear waves traveling across the panel. A reflective array is disposed along the first axis to reflect portions of the shear wave along the plurality of parallel paths extending across a touch surface of the substrate to a second reflective array the axis of which is parallel to the axis of first reflective array.

All these systems engage reflective arrays on the touch panel. it requires extra border spaces on the touch panel making it difficult for the touch panel to fit into today's display enclosure. It also requires an extra process to create the reflective array either by etching or screening process therefore increasing the cost of product as well as decreasing the yield rate during manufacturing. A small defect in the reflective arrays will cause acoustic wave diffraction as well as mode conversion which produces unwanted acoustic wave to interference with the desire acoustic waves therefore reducing the touch accuracy of the panel. Further the spacing between adjacent reflective elements along the array axis limits the touch resolution of the panel because the spacing between adjacent reflective elements along the array axis is the smallest distinguishable distance in the touch panel. On the other words, the touch panel using reflective arrays to scan the acoustic wave is still a discrete system although the touch resolution is much improved than the some systems without using arrays such as those disclosed in prior art U.S. Pat. Nos. 3,673,327 and 5,573,077.

Knowles's system disclosed in U.S. Pat. No. 5,573,077 is shown in which a number of transducers coupled to a side of a substrate impart a shear wave into the substrate for propagation along a number of paths parallel to a first axis. A reflective edge of the substrate first axis disposed along the first axis reflects the shear waves back along the parallel paths to the transducers. The transducers are responsive to the receipt of a shear wave for generating a signal representative thereof A touch on the substrate results in perturbation in the shear wave which is sensed to determine the axial position of the touch on the substrate. The major drawback of this system is that the recognizable touch points is equal to the product of numbers of transducer in one axis and the numbers of transducer in the other axis. In practice, the numbers of transducer in one axis is limited due to the size of transducer. If the size of transducer is too small, a severe diffraction occurs. Also large numbers of transducer will increase the cost of system. The transducers are energized sequentially. Each transducer has to attach an independent wire. This increases the complexity of the system significantly.

OBJECTS AND ADVANTAGES

It is a general object of present invention to provide a position touch sensitive system for use in or with a graphics display apparatus.

It is an object of the invention to provide a position touch responsive system which overcome the disadvantages of prior acoustic touch position sensors as discussed above.

Also, it is an object of the invention to provide a position touch responsive system which has high resolution and performs well in harsh environment.

Yet, it is another object of the invention to provide such a position touch responsive system characterized by minimal mechanical and electrical complexity and reduced cost of manufacture.

The present invention avoid using surface acoustic wave and reflective array, and takes advantage of current market availability of low cost long lead zirconate titanite piezo-electric ceramic transducer bar therefore to reach above-mentioned objects.

SUMMARY OF THE INVENTION

The touch position sensor of the present invention utilizes a plate mode acoustic waves such as shear wave, longitudinal wave, or higher order Lamb waves with large amplitude of longitudinal wave component on the surface, that are excited by a transducer or couple transducers mounted at the edge of substrate along first axis. The plate wave excited by the transducer propagates in a substrate along a second axis perpendicular to first axis wherein a touch on the substrate reflects a pulse acoustic wave with the time of occurrence of which is sensed to determine the position of the touch on the substrate along second axis. Another transducer or transducers array is mounted along the second axis to determine the position of the touch along the first axis. Although any piezoelectric material cut at corrective angle to excite the desire plate wave can be used, typically lead zirconate titanite ceramic bars are used because they are available in the market with length over 5 inch. Further the lead zirconate titanite ceramic bars have high coupling coefficient and low cost. These plate waves have several unexpected advantages over surface acoustic waves which compensate for the lower percentage of total energy absorbed by a touch. One such unexpected advantage is that these plate waves can be generated and received with greater efficiencies than a surface acoustic wave on a non-piezoelectric substrate of the kind suitable for touch plates. This results in a signal with a substantially greater signal to noise ratio so that with the aid of signal processing a plate wave touch position sensor results wherein the sensor is sensitive enough for practical application. In fact, it is because these plate waves are not confined to the surface of the substrate, as are surface acoustic waves, but extend throughout the entire thickness of the substrate that several advantages result from a plate wave touch position sensor. One advantage is that contaminates or other materials abutting the surface of a plate wave touch position sensor do not result in blind spots or significant shadows extending along the axes that intersect the contaminate or matter. Therefore, plate wave touch position sensors are suitable for use in environments that surface acoustic wave sensors may not be. Further, the losses due to air damping are less in a plate wave touch position sensor than in a surface acoustic wave touch position sensor so that the plate waves can travel greater distances than a surface acoustic wave for a given reduction in signal strength. Another major advantage of a plate wave touch position sensor is that virtually the only limit on the thinness of the touch plate is its structural integrity making it extremely practical for applications where the weight of the touch sensor must be minimized.

The advantages and novel features of the present invention, as well as details of an illustrated embodiment thereof, will be more fully understood from the following descriptions and the drawings.

BRIEF DESCRIPTION OF THE DRAWINGS

FIG. 1A is a perspective view of a prior art surface acoustic wave propagating plate;

FIG. 1B is a greatly exaggerated perspective view of a surface acoustic wave traveling in the prior art plate of FIG. 1A;

FIG. 1C is a side cross sectional view of the prior art plate shown in FIG. 1A illustrating the nature of the waves generated in the plate;

FIG. 1D is an illustration of a Rayleigh wave;

FIG. 1E is an illustration of a symmetrical Lamb wave;

FIG. 1F is an illustration of an anti-symmetric Lamb wave;

FIG. 2A is a perspective view of a shear wave propagating plate in accordance with the present invention;

FIG. 2B is a greatly exaggerated perspective view of a shear wave traveling in the plate of FIG. 2A;

DETAILED DESCRIPTION OF THE PREFERRED EMBODIMENT

Figure 3A:
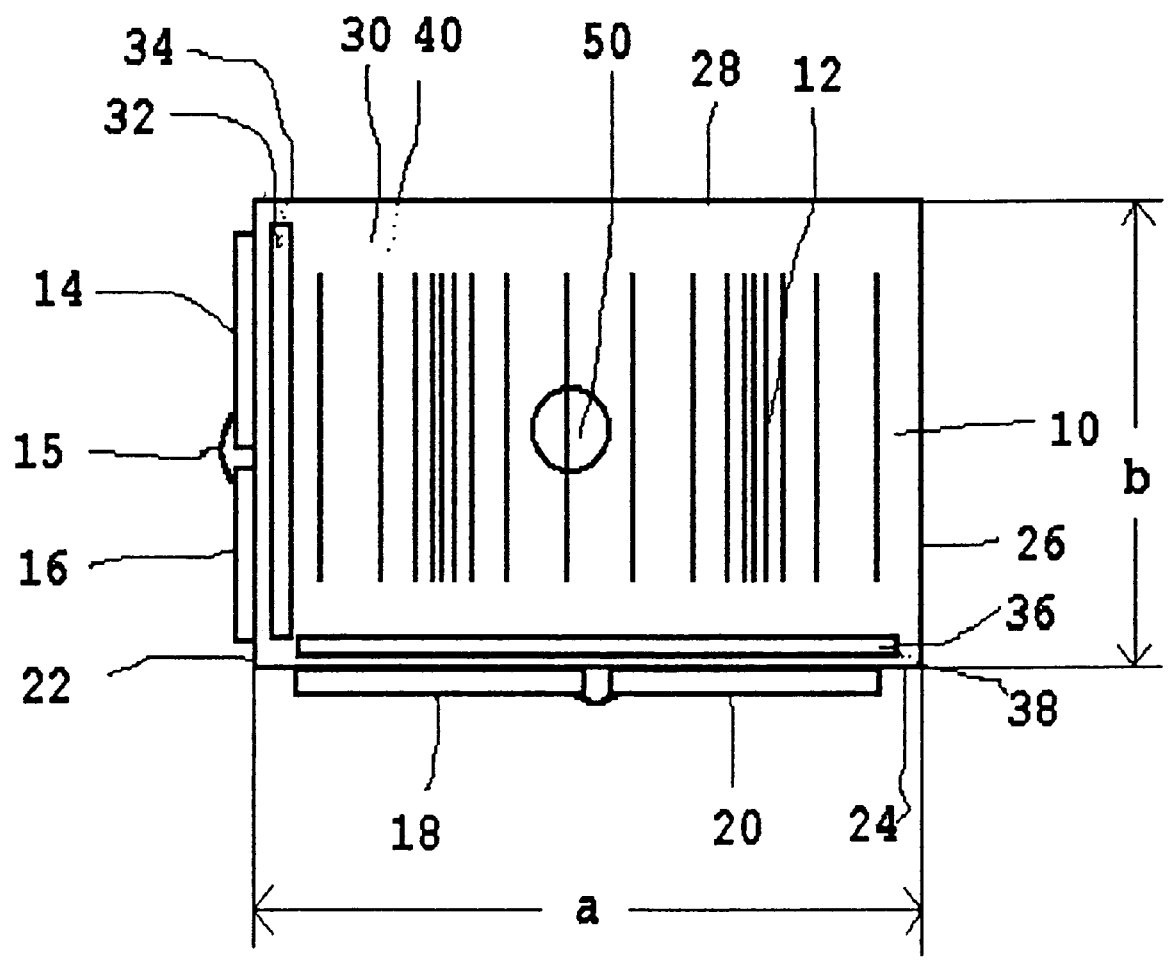
FIG. 3A is a top view of a longitudinal wave touch position sensor in accordance with a first embodiment of the present invention.
Figure 4A:
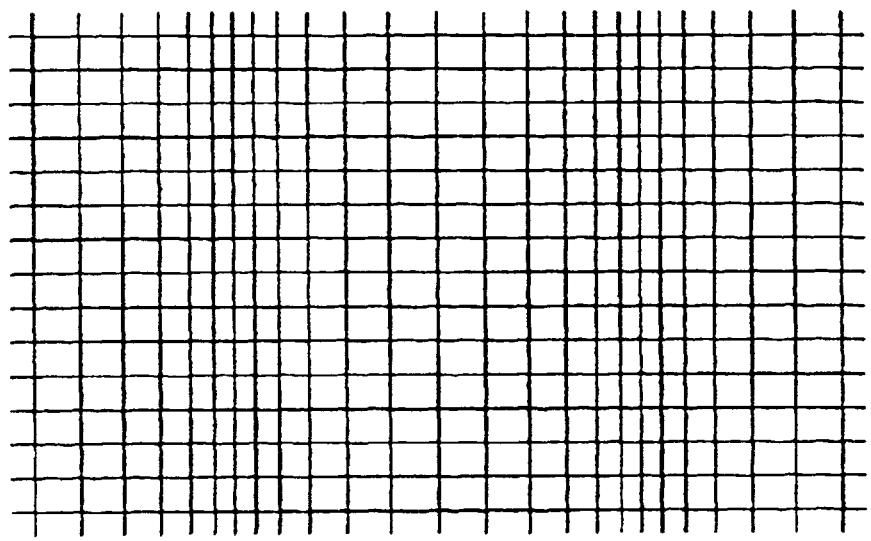
FIG. 4A is an illustration of a longitudinal wave traveling in an unbound plate.
Figure 4B:
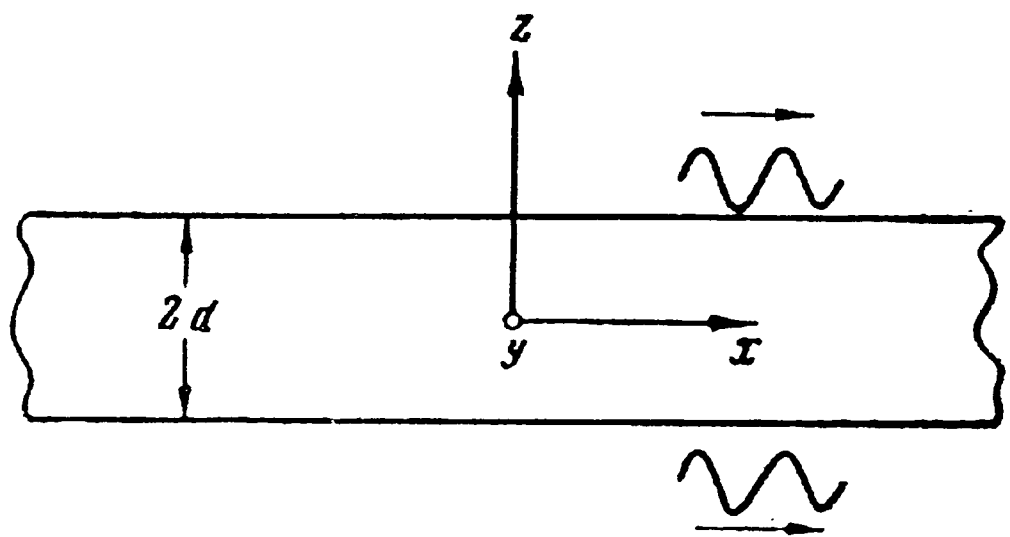
FIG. 4B is a side view of a Lamb wave traveling in a plate.
Figures 5A, 5B, 5C:
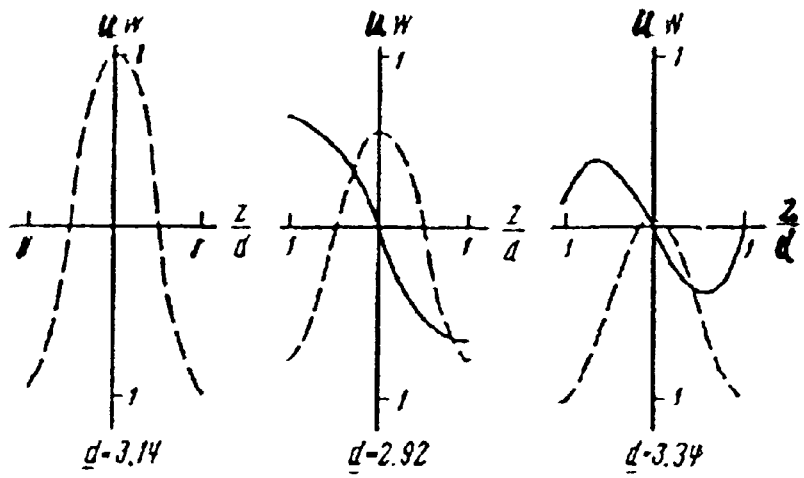
FIGS. 5A to 5G are the distributions of the amplitudes of the tangential and normal displacement with depth for s2 mode with different relative plate thickness.
Figures 5D, 5E, 5F, 5G:
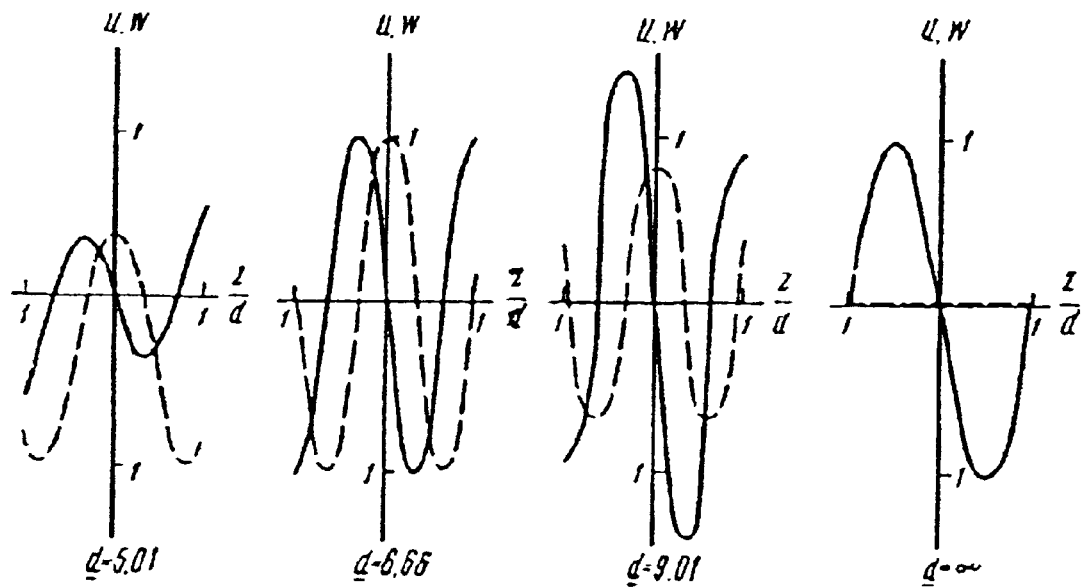
Figures 6A, 6B, 6C:
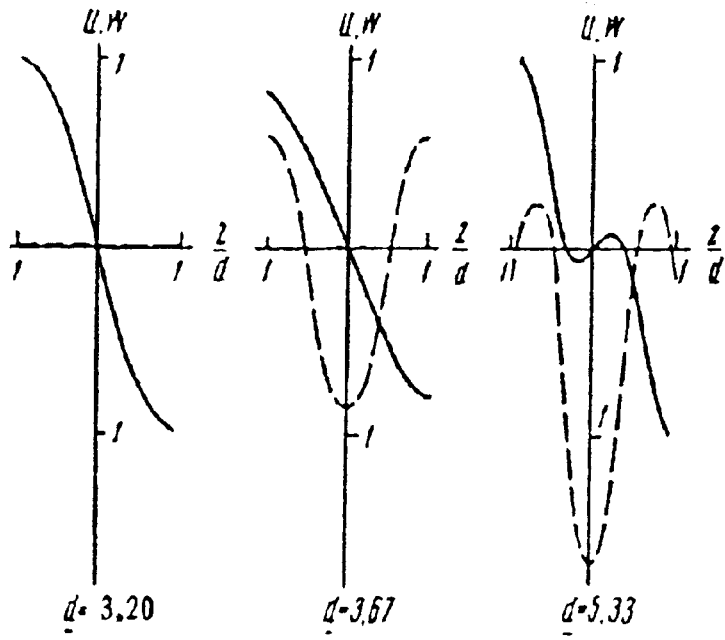
FIGS. 6A to 6G are the distributions of the amplitudes of the tangential and normal displacement with depth for s3 mode with different relative plate thickness.
Figures 6D, 6E, 6F, 6G:
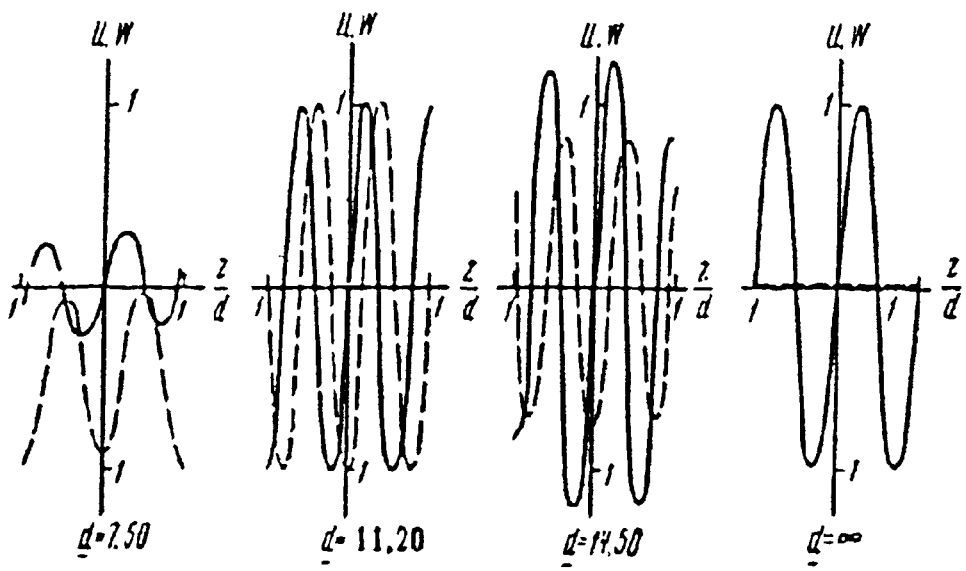
Figures 7A, 7B, 7C, 7D:
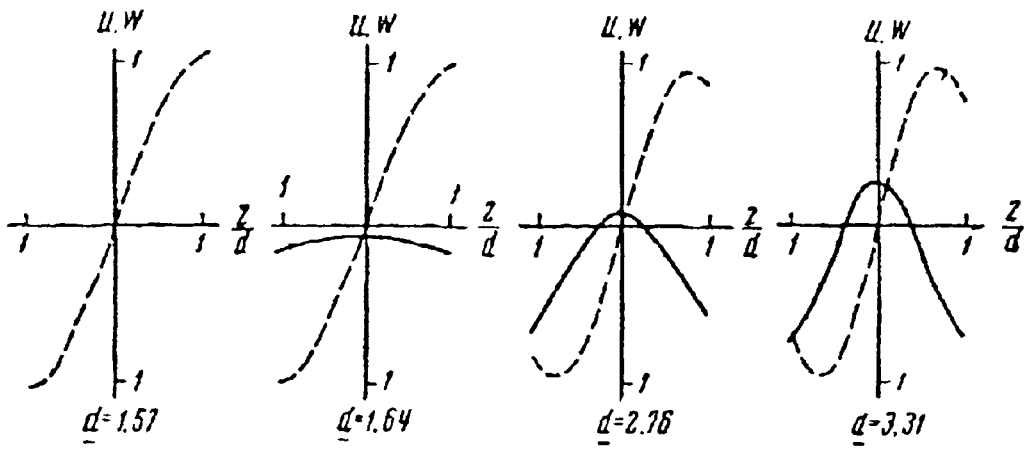
FIGS. 7A to 7H are the distributions of the amplitudes of the tangential and normal displacement with depth for a2 mode with different relative plate thickness.
Figures 7E, 7F, 7G, 7H:
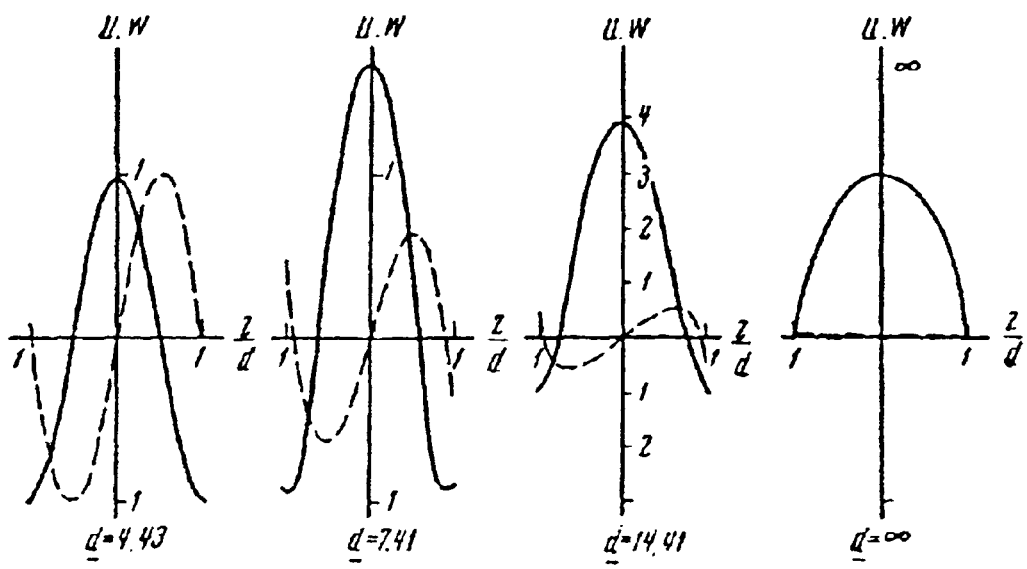
Figures 8A, 8B, 8C, 8D:
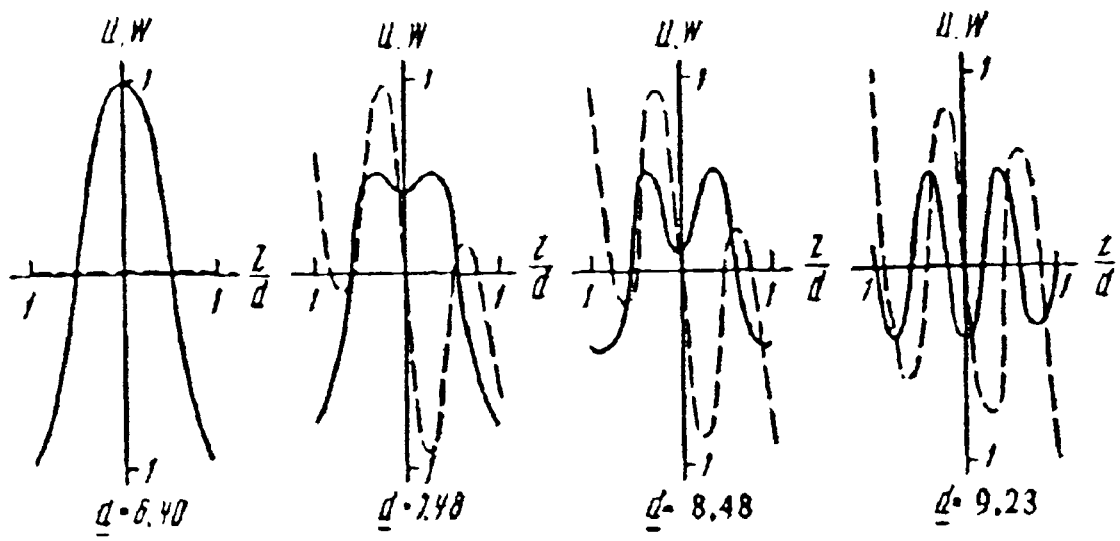
FIGS. 8A to 8H are the distributions of the amplitudes of the tangential and normal displacement with depth for a4 mode with different relative plate thickness.
Figures 8E, 8F, 8G, 8H:
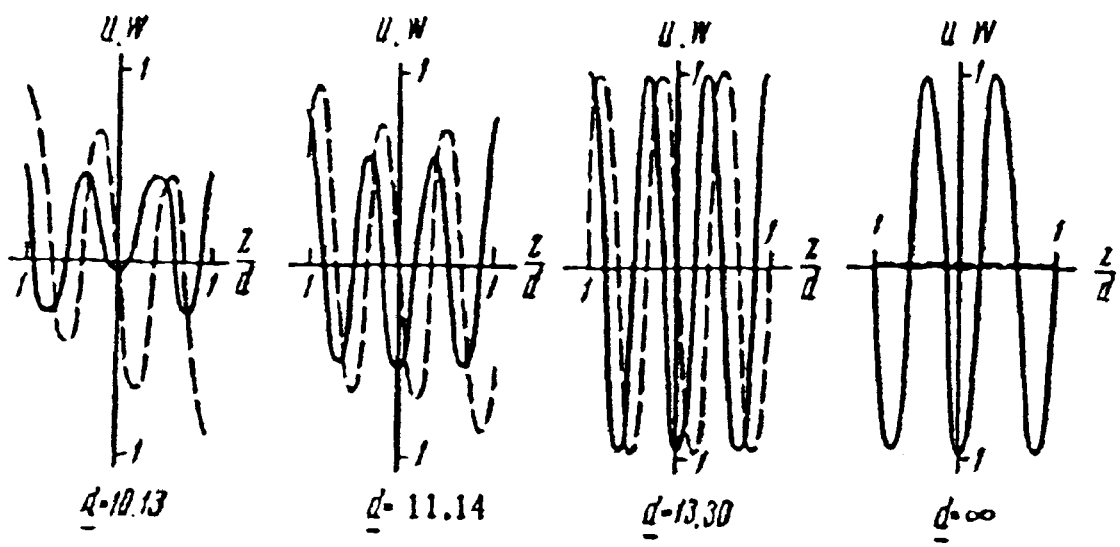

In first embodiment of present invention, a longitudinal plate wave is used in the touch panel as shown in FIG. 3A. The touch position sensor of the present invention includes a substrate 10 that is capable of propagating a longitudinal wave 12. In general, a true longitudinal wave only propagates in unbound substrate as shown in FIG. 4A, but a set of special longitudinal waves can propagate in a plate if the thickness of the plate is properly chosen to be exactly an integer times the half of longitudinal wavelength. These longitudinal waves are called generated longitudinal waves, and the proper thickness and the propagation frequency are called critical values. (See Rayleigh and Lamb Waves—Physical Theory and Application, by Igor. Aleksndrovich Viktorov, Plenum Press, 1967, New York.) In according with present invention, the longitudinal wave means generated longitudinal wave. Viktorov calculated distributions of the amplitudes of the tangential displacement U (dashed curves) and normal displacement W (solid curves) with depth in four Lamb wave modes s2, s3, a2, a4 shown in FIGS. 5–8, respectively. (Viktorov addressed these four Lamb modes as s1, s2, a1, a3 and Lamb wave starts at s0, a0 modes, I change to s2, s3, a2, a4 just to be consistent with early citing from Knowles' patents which addresses Lamb wave starting from s1, a1 modes). Two of these modes are symmetrical, two are anti-symmetrical. The distributions have been constructed for each of the mode with seven or eight values of relative plate thickness $\underline{d}$, beginning with the critical values corresponding to the onset of the mode and extending $\underline{d}$ to infinitive. The relative plate thickness is defined by:

$$\underline{d}=2\pi f\, d/Vs$$

where f is propagation frequency, d is the half-thickness of plate as shown in FIG. 4B, Vs is shear wave velocity. The values $\underline{d}$ of are indicated in each graph. The distribution curves are drawn in dimensionless form; the depth z, measured from the median plane of the plate and plotted on the horizontal axes of all graphs is referred to the half-thickness of the plate d; the displacement amplitudes U and W along the x and z axes, which are plotted on the vertical axes, are referred to an average amplitudes of the surface displacement, equal to the square root of the sum of the squares of the surface displacement amplitudes along the x and z axes. The curves have been calculated for the values with the Poisson ratio ν=0.34. FIG. 5A and FIG. 7A are generated longitudinal waves since the normal displacement W are all equal to zero. FIG. 5C, FIG. 6D, FIG. 7B and FIG. 8D are classified as the high order Lamb wave with large amplitude of longitudinal component on the surfaces since these Lamb wave modes have large tangential displacement and small normal displacement on the surfaces (i.e. z=±d). These high order Lamb wave mode have the same novel features as other plate mode like horizontally polarized shear wave, or generated longitudinal wave. (See: D. C. Worlton, Journal of Appl. Phys., Vol. 32, No. 6, 967 (1961).) Since the embodiment and operations in present invention in using generated longitudinal wave or the high order Lamb wave mode with large amplitude of longitudinal components are identical, the only embodiment and operations in using generated longitudinal wave is illustrated.

Returning to FIG. 3A, the substrate 10 may be formed of tempered or frosted glass, plastic, metal or ceramic. The substrate 10 may further be formed as a flat plate as shown or the substrate may be curved. In order to induce a longitudinal wave propagating in the X direction, a piezoelectric transducer 14 is bonded on to an edge 22 of the substrate 10 perpendicular to the axis of propagation, X. If one transducer is not long enough to cover the required touch area, two or more transducers 14 and 16 can be mounted at the edge 22 of the substrate 10. These transducers 14 and 16 mounted at the edge 22 are driven by one identical signal source. Only one wire 13 is connected to one of the transducers for example transducer 14. The other transducer 16 is connected to the driver signal source by a conductive epoxy 15 contacting the top of transducers 14 and 16 together. The edges 22, 24, 26 and 28 of substrate 10 is coated with conductive frits or epoxy to provide a common ground to all the transducers 14, 16, 18 and 20. In such embodiment as shown in FIG. 3A, the X transducers array 14, 16 and Y transducers array 18, 20 behaves like a single X transducer and Y transducer, therefore only transducer 14 or 18 are mentioned in the description of the preferred embodiment. The transducer 14 is responsive to a drive signal for vibrating along the X axis wherein a longitudinal wave 12 is induced in the transducer 14 and coupled thereby directly to the substrate 10. As shown in FIG. 4A, the longitudinal wave 12 imparted into the substrate 10 is not confined to a single surface of the substrate 10, but extends throughout the entire thickness of the substrate 10. A touch position sensor in accordance with a first embodiment of the present invention is shown in FIG. 3A having a transducer 14, 18 for both transmitting and receiving longitudinal wave associated with each axis for which a coordinate is desired to be determined. In accordance with the present invention, the piezoelectric transducers 14 and 18 are bonded on to the sides 22 and 24 of the substrate 10 by means of a conductive frit or conductive epoxy. The height of the transducers 14 and 16 and the height of the conductive frits or epoxy bonding the transducers to the substrate 10 are equal to the thickness of the substrate 10. The piezoelectric transducers 14 and 18 are thin so as not to protrude outwardly from the sides 22 and 24 of the substrate to any appreciable extent. Further, since the transducers do not protrude above or below the top or bottom surfaces 30 and 40 of the substrate 10, the substrate 10 may be mounted in any fixture accommodating a plate of the same size without making special accommodations for the transducers. In this transducer mounting configuration, a small amount of first order symmetric and anti-symmetric Lamb waves will be generated simultaneously. To eliminate these undesired Lamb waves, an absorbing strips 32, 34, 36, and 38 are applied to top and button of substrate 10. The lamb wave is preferentially absorbed with respect to longitudinal wave (referring to D. C Worlton), and virtual extinction of residual Lamb can be accomplished with negligible attenuation of the longitudinal wave. Effective absorbing strips can be formed from epoxies, silicones, tape, and the like. For particular applications the touch panel is required to be affixed to an overlying rim or bezel with a sealant, in which case the sealant itself may act as the upper absorbing strips.

Figure 9A:
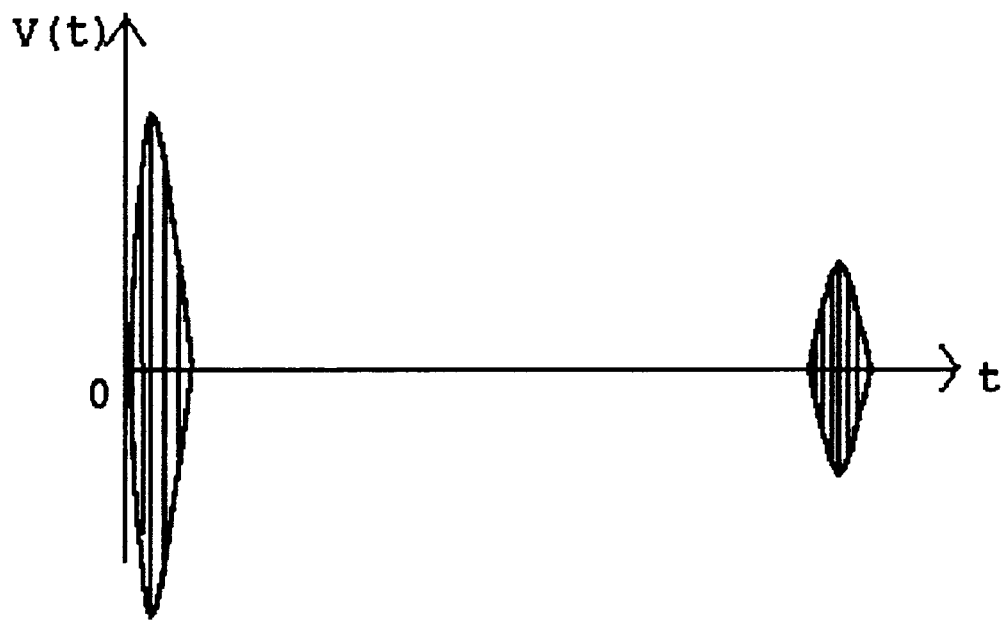
FIG. 9A is a graph illustrating signal received by transducer with no touch on the panel.
Figure 9B:
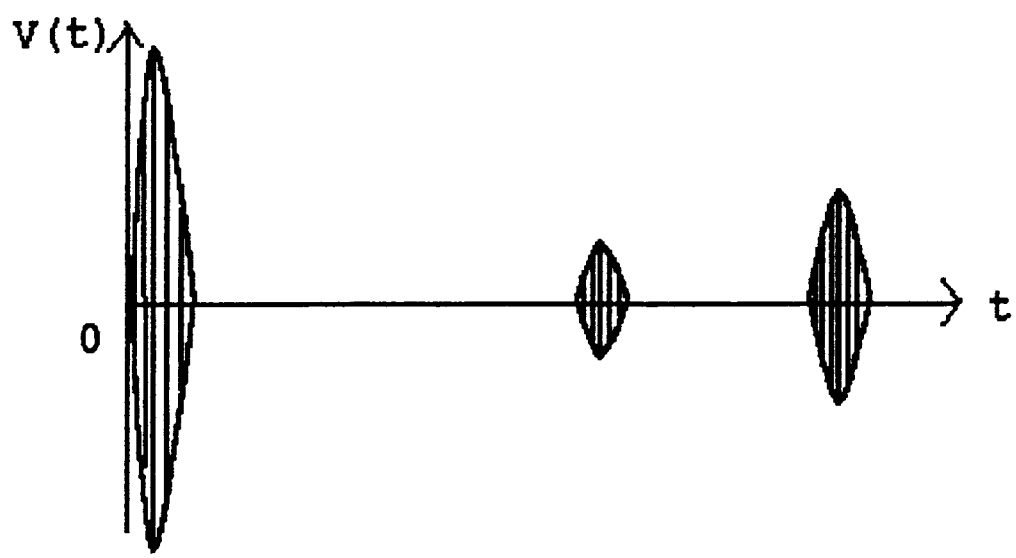
FIG. 9B is a graph illustrating signal received by transducer with touch on the panel.

In order to define the X axis coordinate, the X transducer 14 is bonded on to an edge 22 of the substrate 10 wherein the edge 22 is perpendicular to the X axis. The transducer 14 vibrates along the X axis to impart a longitudinal wave that travels along the X axis. When there is not touch on the substrate 10, the imparting longitudinal wave will travels to the edge 26 of substrate 10 and reflects back to the transducer 14. FIG. 9A is the signals detected by the transducer 14. The transit time of the pulse reflected by the edge 22 is used to calibrate the X size. When there is a finger or other absorbing stylus 50 in contact with the substrate 10, a small portion of longitudinal wave will be reflected back to the transducer 14 as shown in FIG. 9B. The product of the propagation time and the velocity of the longitudinal wave (5640 m/s for Pyrex glass plate) is twice of the distance between the transducers 14 and the stylus 50. Similarly, in order to define the Y axis, the Y transducer 18 is bonded on the edge 24 of the substrate 10 wherein the edge 24 is perpendicular to the Y axis. The transducer 18 vibrates along the Y axis of the substrate 10 to impart the longitudinal wave to the substrate 10 where the Y coordinate of the touch is determined.

Figure 10:
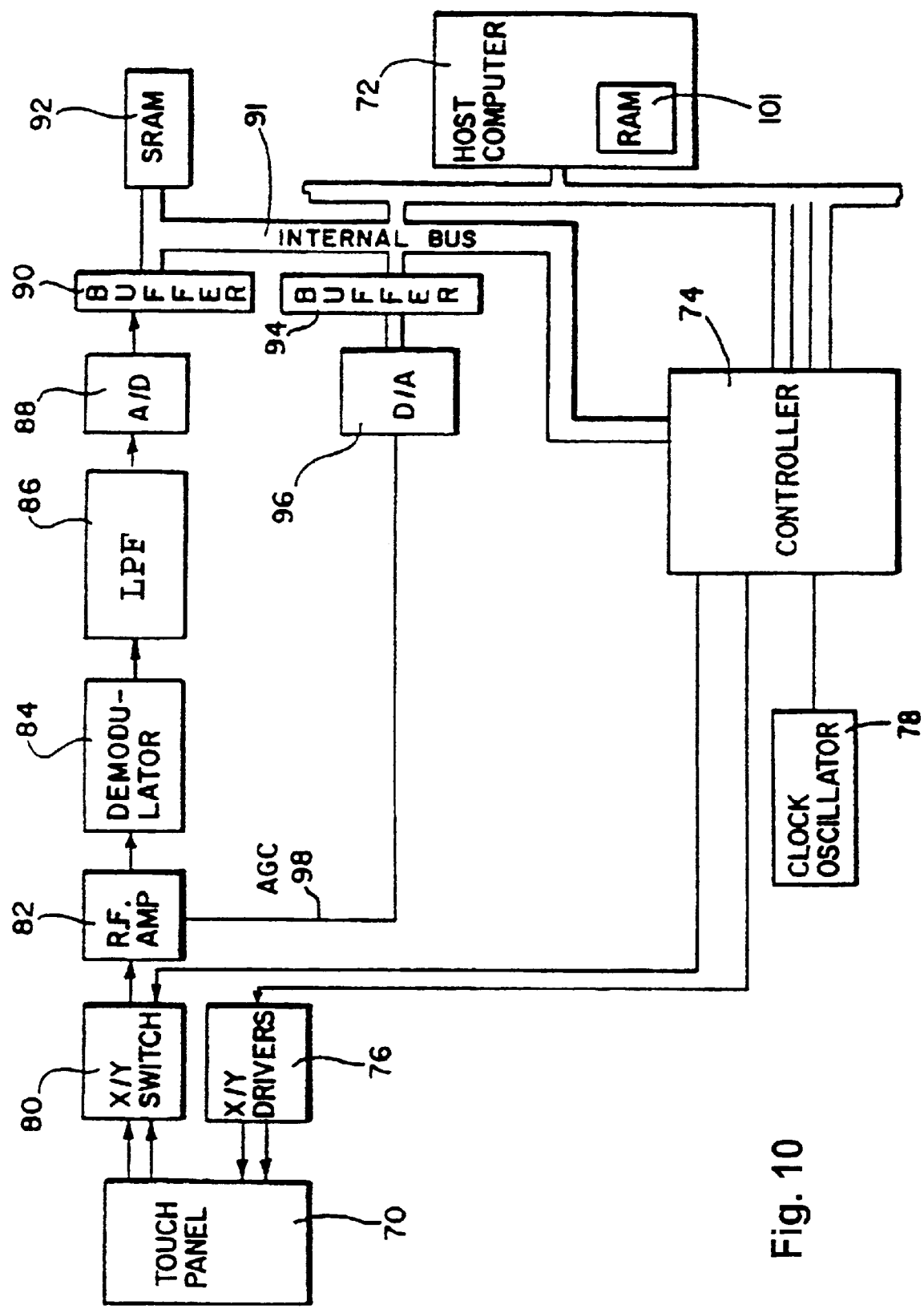
FIG. 10 is an illustrating the signal processing portion of the touch position sensor illustrated in FIG. 3A or FIG. 3B.
Figure 11A:
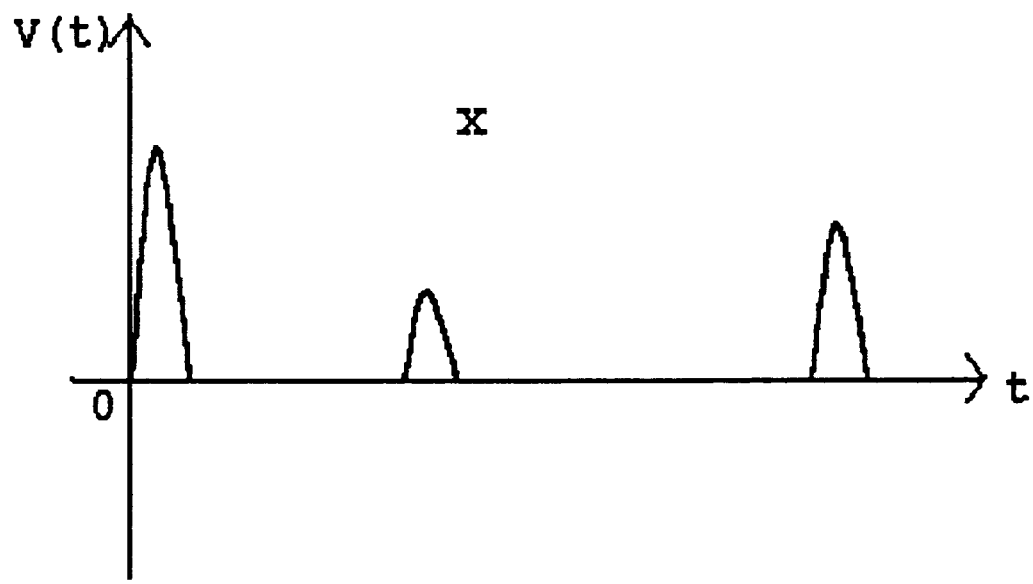
FIG. 11A is a graph illustrating X signal out from the low pass filter with touch on the panel.
Figure 11B:
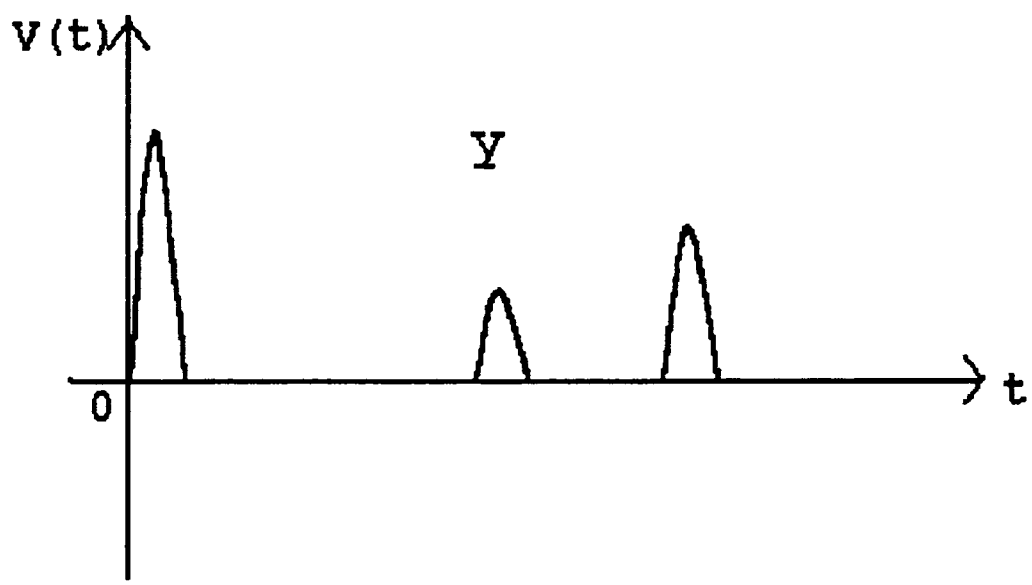
FIG. 11B is a graph illustrating Y signal out from the low pass filter with touch on the panel.

The detail electronic and detection procedure is illustrated in FIG. 10. A host computer 72 that may include a microprocessor or the like initiates a scan cycle of the touch panel 70 by instructing a controller 74. The controller 74 is responsive to an initiate scan cycle instruction from the computer 72 to apply a drive signal to the X transducer 14 through an X driver 76 wherein the timing of the controller 74 is determined by a clock/oscillator 78. The drive signal applied to the transducer 18 is a burst drive signal in the form of a square wave. The number of cycles is equal to half inch divided by the wave length of the longitudinal wave propagating in the panel 70. The controller 74 also sets an X/Y switch 80 to the X position to couple the signal received by the transducer 14 to an R.F. amplifier 82. The amplified X axis signal output from the amplifier 82 is applied to a demodulator 84 that removes the alternating component from the amplified X axis signal to provide an envelope waveform such as depicted in FIG. 11A. The output of the demodulator 84 is coupled to a low pass filter 86. The output of the low pass filter 86 is applied to an analog to digital converter (A/D) 88 the output of which is coupled by a buffer 90 to an internal bus 91. The controller 74 stores the digital data output from the analog to digital converter 88 in a static RAM 92 such that a value representing the amplitude $SX_k$ of the X axis signal at each point in time $K/f_s$ as sampled by the analog to digital converter 88. Where k is the number index from analog to digital converter 88, and $f_s$ is the sampling frequency of the analog to digital converter 88. After the X. axis data is stored in the static RAM 92, the controller 74 controls the Y driver 76 to apply a burst drive signal to the Y axis transmitting transducer 18 of the touch panel 70. The controller 74 also changes the state of the X/Y switch 80 so that the Y transducer 18 is coupled to the R.F. amplifier 82. The digital data representing the Y axis signal as output from the analog to digital converter 88 is likewise stored in the static RAM 92 such that a value representing the amplitude of the Y axis signal $SY_k$ at each point in time $K/f_s$ as sampled by the analog to digital converter 88 is stored in a location in the static RAM 92.

Figure 12A:
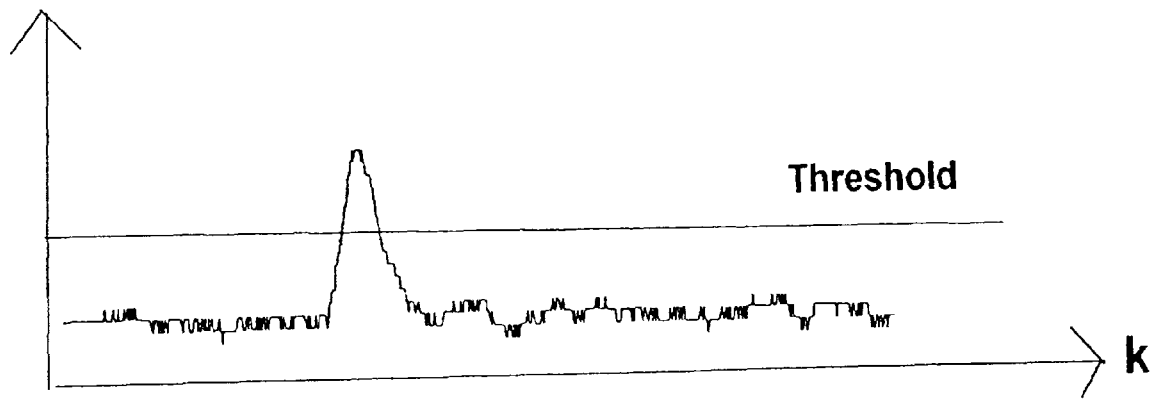
FIG. 12A is a graph illustrating the different signal data output from the A/D with touch on the panel over a threshold value.
Figure 12B:
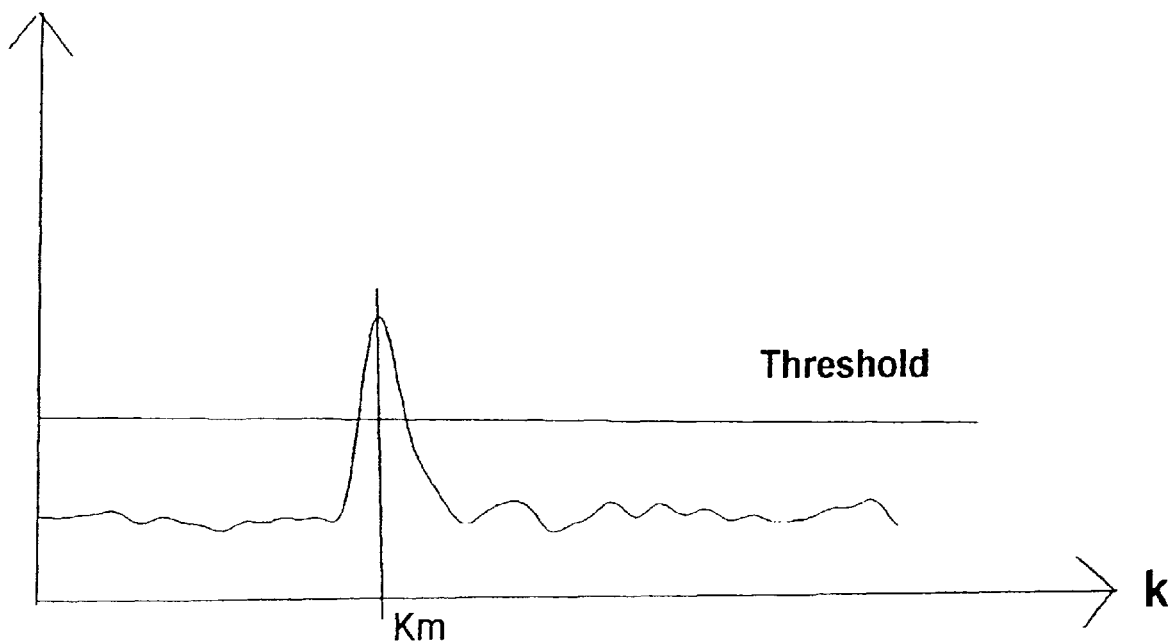
FIG. 12B is a graph illustrating the different signal data output after digital signal processing with touch on the panel over a threshold value.

During the initialization of the system, a scan cycle is performed for an untouched panel 70 to obtain the length (a) and width (b) of panel 70 as shown in FIG. 3A by detecting the transit time of acoustic signal of the end spike, which is reflected by the edge. In accordingly, the gain G(a, t) of the R.F Amplifier 82 for X axis is set by:

$$G(a, t) = A(a) \exp[B(a) t] \qquad (1)$$

where A(a), B(a) are constants. The signal reflected by a finger or stylus is proportional to the propagation signal at the point of contact. The propagation signal is exponentially decaying with the traveling distance. The gain of the amplifier 82 is set at exponential increase as shown in Eq.(1) to compensate for signal decreasing along the distance so as to obtain the same reflected signal amplitude wherever the same finger or stylus touches the panel using the equal pressure. In practice the exponential gain is realized by N steps of gain with time. For example, 8 inch length can be divided into 8 steps of gain for example, 20 dB gain the first inch, following by 22 dB from first inch to second inch and the same way up to 34 dB from seven inch to eight inch. With the exponential gain setup, a constant threshold as shown in FIGS. 12A and 12B is used by the microprocessor to determine the present of touch on the panel 70. The gain G(b, t) of the R.F Amplifier 82 for Y axis is set likewise by:

$$G(b, t) = A(b) \exp[B(b) t] \qquad (2)$$

where A(b), B(b) are constants. After the gain setup, the controller sends a burst to X driver and receives a set of data from analog to digital converter 88 which are stored in SRAM 92 as X reference data for no touch. By analogy, Y reference data are stored in SRAM 92. Then the controller will scan the X transducer 14 and obtains a new set of data from analog to digital converter 88. These new set of data is subtract by the early X reference data stored at SRAM 92 at same time index to generate a different data array as shown in FIG. 12A. The different data are fed into some simple digital signal processing (DSP) algorithm inside the microprocessor. The output from the DSP algorithm is compared to a threshold value as shown in FIG. 12B. If a data amplitude is over the threshold, it indicates that a touch is present in the panel 70. The microprocessor further detects the index number where maximum different amplitude data Km occurs as shown in FIG. 12B and store Km in SRAM 92. Then, by analogy, the index number where maximum different amplitude data from Y axis is detected. These index number as detected times the velocity and divided by the sampling frequency of A/D are reported as the coordinates of touch on the panel 70.

Figure 3B:
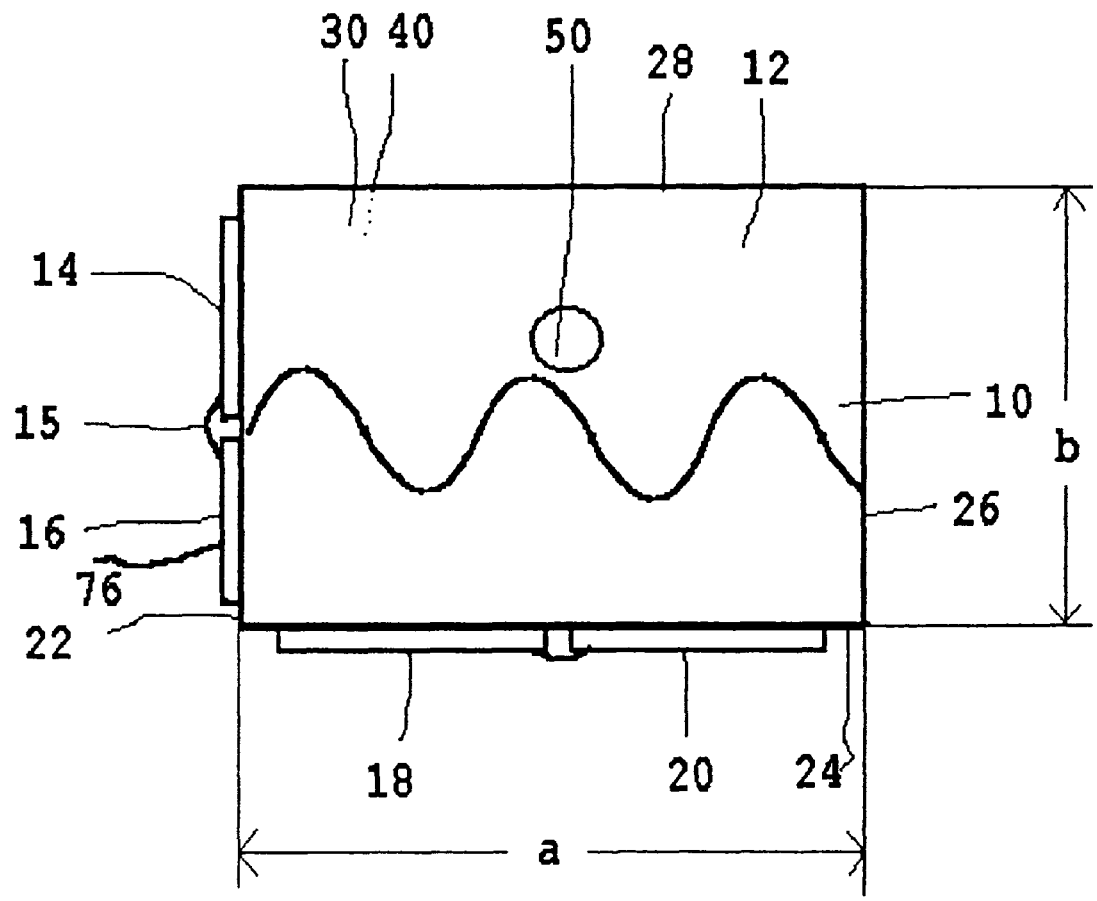
FIG. 3B is a top view of a shear wave touch position sensor in accordance with a second embodiment of the present invention.

In another embodiment of present invention, the shear wave is used. The touch position sensor of the present invention includes a substrate 10 that is capable of propagating a shear wave 12 as shown in FIG. 3B. The substrate 10 may be formed of tempered or frosted glass, plastic, metal or ceramic. The substrate 10 may further be formed as a flat plate as shown or the substrate may be curved. In order to induce a shear wave propagating in the X direction, a piezoelectric transducer 14 is bonded on to an edge 22 of the substrate 10 perpendicular to the axis of propagation, X. The transducer 14 is responsive to a drive signal for vibrating along the Y axis wherein a horizontal shear wave 12 is induced in the transducer 14 and coupled thereby directly to the substrate 10. Here as shown in FIG. 2B, the shear wave 12 imparted into the substrate 10 is also not confined to a single surface of the substrate 10, but extends throughout the entire thickness of the substrate 10. The particles of the shear wave move only in the Y direction. It is noted that shear waves may be symmetric or anti-symmetric about the median plane. In the preferred embodiment of the present invention a non-dispersive shear wave is employed. More particularly, this non-dispersive mode is the zeroth order of the following plate solution for a wave traveling in the X direction.

$$Ux = 0 \qquad (3a)$$

$$Uy = A \exp[2.\pi.i \, (x/\lambda\text{-ft})] \qquad (3b)$$

$$Uz = 0 \qquad (3c)$$

where Ux, Uy, Uz are displacement components in the x, y and z directions respectively, A is a constant, λ is the wavelength, and f is the number of cycles per second. This shear wave is designated herein as the zeroth order horizontally polarized shear wave or Zohps wave. (See Physical Acoustics, Ed. W. P. Mason, Voll-Part A P120, Academic Press 1964, New York and London).

A touch position sensor in accordance with a second embodiment of the present invention is shown in FIG. 3B having a transducer 14, 16 for both transmitting and receiving Zohps wave associated with each axis for which a coordinate is desired to be determined. Returning to FIG. 3B, in accordance with the present invention, the piezoelectric transducers 14 and 18 are bonded on to the sides 22 and 24 of the substrate 10 by means of a conductive frit or conductive epoxy. The conductive frit or conductive epoxy is coated around the four edges 22, 24, 26, 28 of the substrate 10 so to create a common ground wires connected to all the transducers. The height of the transducers 14 and 18 and the height of the conductive frits or epoxy bonding the transducers to the substrate 10 are equal to the thickness of the substrate 10 so that substantially only the fundamental mode of the shear wave is generated in the substrate 10. The piezoelectric transducers 14 and 18 are thin so as not to protrude outwardly from the sides 22 and 24 of the substrate to any appreciable extent. Further, since the transducers do not protrude above or below the top or bottom surfaces 30 and 40 of the substrate 10, the substrate 10 may be mounted in any fixture accommodating a plate of the same size without making special accommodations for the transducers.

In order to define the X axis coordinate, the X transducer 14 is bonded on to an edge 22 of the substrate 10 wherein the edge 22 is perpendicular to the X axis. The transducer 14 vibrates along the Y axis to impart a shear wave that travels along the X axis. When there is not touch on the substrate 10, the imparting shear wave will travels to the edge 22 of substrate 10 and reflects back to the transducer 14 as shown in FIG. 9A. The propagation time of the pulse reflected by the edge 22 can be used to calibrate the X size. When there is a finger or other absorbing styles 50 in contact with the substrate 10, a small portion of shear wave will be reflected back to the transducer 14 as shown in FIG. 9B. The product of the half of the propagation time and the velocity of the Zohps wave is the distance between the transducers 14 and the stylus 50. Similarly, in order to define the Y axis, the Y transducer 18 is bonded on the edge 24 of the substrate 10 wherein the edge 24 is perpendicular to the Y axis. The transducer 18 vibrates along the X axis of the substrate 10. This embodiments use the identical electronic as described in the first embodiment except that the velocity of shear wave is 3280 m/s instead of velocity of longitudinal wave 5640 m/s in Pyrex glass.

In case of a curved display such as cathode ray tube (CRT), the present invention can be easily adapted to curved substrate. The curved substrate is cut along the line of longitude so that the projection of curved substrate is a rectangular. Then FIGS. 3A–3B become the projection view of the preferred embodiment with curved substrate. The acoustic wave travels along the great circle lines (the line of latitude in this case) between the edges, which are lines of a longitude. This configuration allows minimum distortions due to curved substrate. The small transducers are more accurately matching the curved edges because of rectangle shape of transducers.

Since changes may be made in the above described apparatus without departing from the scope of the present invention, it is intended that the above description and drawing be interpreted as illustrative and not in a limiting sense.

What is claimed and desired to be secured by Letters Patent is:

1. A touch position sensor comprising:
   a. a substrate capable of propagating a shear wave, said substrate having at lease one touch surface;
   b. a first transducer or first linear transducer array positioned along first edge of said substrate,
   c. a second transducer or second linear transducer array positioned along second edge of said substrate at a predetermined angle to the first edge, said transducer arrays or transducers being such as to act as transmitters and receivers of shear waves on said substrate,
   d. a pulsed source of energy connected to said transducers for generating shear wave on the substrate, and
   e. receiver and timing means connected to the transducers for detecting and timing reflected energy pulses such that the position of a human finger or other passive stylus placed on the substrate and causing reflections will be determine.

2. A touch position sensor as recited in claim 1 wherein said propagating means propagates a zeroth order horizontally polarized shear wave.

3. A touch position sensor as recited in claim 1 wherein said substrate is formed of plastic.

4. A touch position sensor as recited in claim 1 wherein said substrate is formed of glass.

5. A touch position sensor as recited in claim 1 wherein said substrate is formed of metal.

6. A touch position sensor as recited in claim 1 wherein said substrate is formed of a ceramic.

7. A touch position sensor as recited in claim 1 wherein said substrate is curved.

8. A touch position sensor as recited in claim 4 wherein said glass is frosted.

* * * * *